US012687601B2

(12) United States Patent
Wigard et al.

(10) Patent No.: US 12,687,601 B2
(45) Date of Patent: Jul. 21, 2026

(54) DEVICE POSITIONING

(71) Applicant: Nokia Technologies Oy, Espoo (FI)

(72) Inventors: Jeroen Wigard, Aalborg (DK); Frank Frederiksen, Aalborg (DK); Enric Juan, Aalborg (DK); Rafhael Medeiros De Amorim, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 356 days.

(21) Appl. No.: 18/479,932

(22) Filed: Oct. 3, 2023

(65) Prior Publication Data

US 2024/0121749 A1 Apr. 11, 2024

(30) Foreign Application Priority Data

Oct. 7, 2022 (FI) ...................................... 20225905

(51) Int. Cl.
*G01S 5/00* (2006.01)
*G01S 5/02* (2010.01)

(52) U.S. Cl.
CPC .......... *G01S 5/0036* (2013.01); *G01S 5/0258* (2020.05)

(58) Field of Classification Search
CPC .... G01S 5/0027; G01S 5/0036; G01S 5/0258; G01S 5/021; G01S 5/0263
See application file for complete search history.

(56) References Cited

U.S. PATENT DOCUMENTS

| | | | |
|---|---|---|---|
| 10,390,180 B1 | 8/2019 | Li et al. | |
| 2002/0019698 A1* | 2/2002 | Vilppula | G01S 5/0263 |
| | | | 342/357.31 |
| 2003/0164796 A1* | 9/2003 | Needham | G01S 19/48 |
| | | | 342/357.46 |
| 2004/0152471 A1* | 8/2004 | MacDonald | G01S 5/0252 |
| | | | 455/456.1 |

(Continued)

FOREIGN PATENT DOCUMENTS

| | | |
|---|---|---|
| WO | 2022/154861 A1 | 7/2022 |
| WO | 2022/157018 A1 | 7/2022 |

OTHER PUBLICATIONS

Extended European Search Report received for corresponding European Patent Application No. 23201405.0, dated Mar. 27, 2024, 9 pages.

(Continued)

*Primary Examiner* — Resha Desai
*Assistant Examiner* — Fred H Mull
(74) *Attorney, Agent, or Firm* — Carter, DeLuca & Farrell LLP

(57) ABSTRACT

According to an example aspect of the present invention, there is provided an apparatus, such as a user equipment, configured at least to process a measurement instruction received in the apparatus from a cellular communication system, based on the measurement instruction, measure a received signal strength of a signal from each cell of a first cell set and each cell of a second cell set, the first cell set and the second cell set comprising cells of the cellular communication system, and determine a first signal strength value for the first cell set and a second signal strength value for the second cell set, and report to the cellular communication system a value obtained from the first signal strength value and the second signal strength value.

1 Claim, 5 Drawing Sheets

(56) References Cited

U.S. PATENT DOCUMENTS

| | | | | |
|---|---|---|---|---|
| 2007/0216540 A1* | 9/2007 | Riley | | G01S 19/48 |
| | | | | 342/357.29 |
| 2009/0189810 A1* | 7/2009 | Murray | | G01S 5/011 |
| | | | | 342/450 |
| 2010/0203899 A1 | 8/2010 | Sheynblat et al. | | |
| 2014/0038637 A1 | 2/2014 | Sheynblat et al. | | |
| 2019/0069262 A1* | 2/2019 | Harney | | G01S 5/02525 |
| 2022/0046578 A1 | 2/2022 | Edge | | |
| 2022/0248367 A1 | 8/2022 | Kumar et al. | | |

OTHER PUBLICATIONS

"3rd Generation Partnership Project; Technical Specification Group Radio Access Network; NR; Radio Resource Control (RRC) protocol specification (Release 17)", 3GPP TS 38.331, V17.1.0, Jun. 2022, pp. 1-1273.

"Solutions for NR to support non-terrestrial networks (NTN)", 3GPP TSG RAN meeting #86, RP-193234, Agenda: 9.1.2, Thales, Dec. 9-13, 2019, 10 pages.

"3rd Generation Partnership Project; Technical Specification Group Radio Access Network; Solutions for NR to support non-terrestrial networks (NTN) (Release 16)", 3GPP TR 38.821, V16.1.0, May 2021, pp. 1-140.

Wang et al., "Low Complexity Direction of Arrival (DoA) Estimation for 2D Massive MIMO Systems", IEEE Globecom Workshops, Dec. 3-7, 2012, pp. 703-707.

"3rd Generation Partnership Project; Technical Specification Group TSG RAN; Study on requirements and use cases for network verified UE location for Non-Terrestrial-Networks (NTN) in NR (Release 18)", 3GPP TR 38.882, V1.0.0, Jun. 2022, 14 pages.

"Revised WID: NR NTN (Non-Terrestrial Networks) enhancements", 3GPP TSG RAN Meeting #96, RP-221819, Agenda: 9.3.2.7, Thales, Jun. 6-9, 2022, 8 pages.

"Network verified UE location for NR NTN", 3GPP TSG RAN WG1 #110, R1-2207256, Agenda: 9.12.2, Qualcomm Incorporated, Aug. 22-26, 2022, pp. 1-9.

"FL Summary #2: Network verified UE location for NR NTN", 3GPP TSG RAN WG1 Meeting #110, R1-2207629, Agenda: 9.12.2, Thales, Aug. 22-26, 2022, pp. 1-38.

Office action received for corresponding Finnish Patent Application No. 20225905, dated Feb. 23, 2023, 11 pages.

* cited by examiner

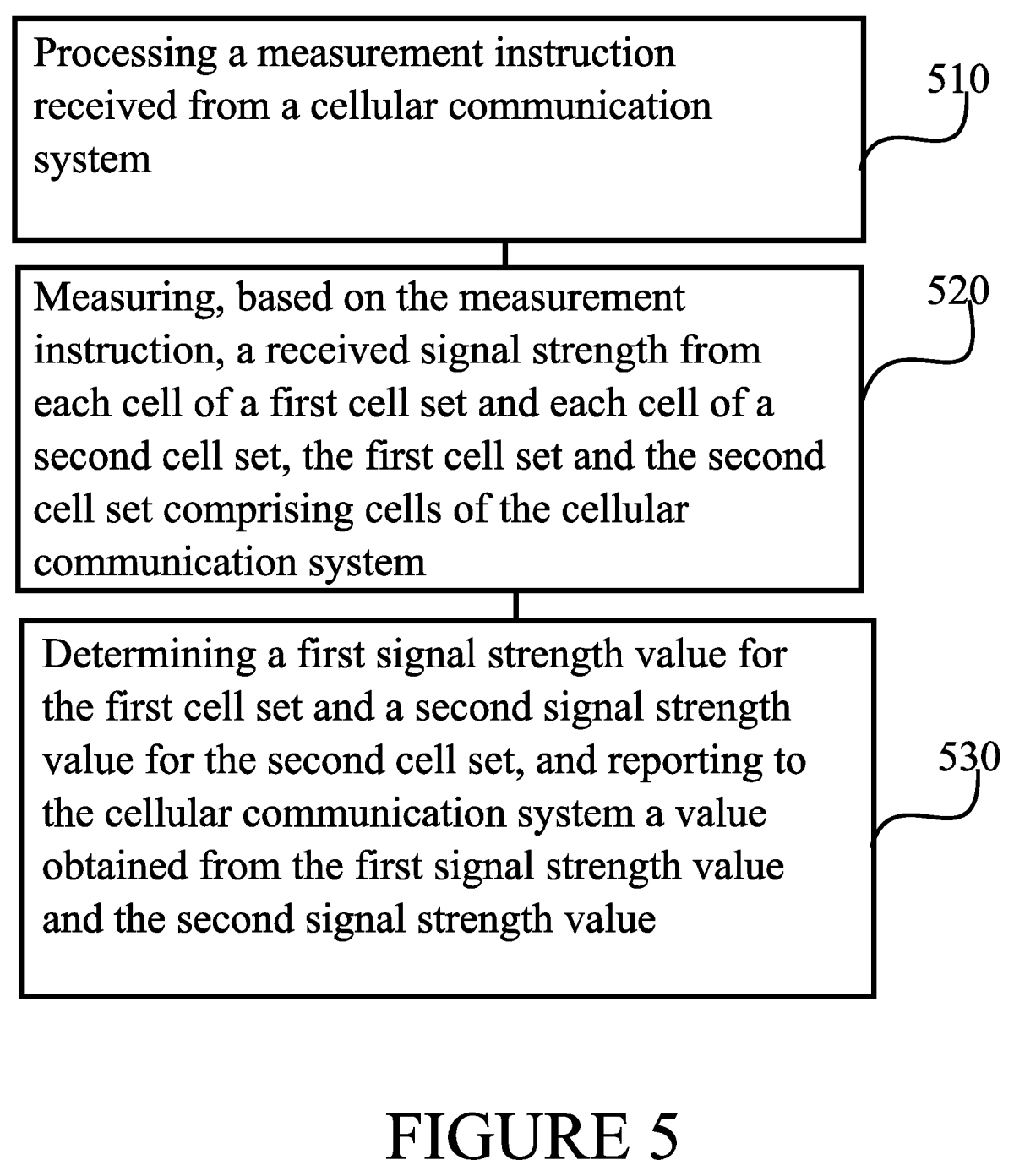

Processing a measurement instruction received from a cellular communication system     510

Measuring, based on the measurement instruction, a received signal strength from each cell of a first cell set and each cell of a second cell set, the first cell set and the second cell set comprising cells of the cellular communication system     520

Determining a first signal strength value for the first cell set and a second signal strength value for the second cell set, and reporting to the cellular communication system a value obtained from the first signal strength value and the second signal strength value     530

FIGURE 5

DEVICE POSITIONING

FIELD

The present disclosure relates to positioning of nodes in a wireless communication network.

BACKGROUND

Deriving an estimated location for a node of a wireless communication node, such as, for example, a user equipment, UE, of a cellular communication network, is known as positioning this node. Positioning may be based on trilateration, time difference of arrival, or multilateration mechanisms, for example. One well known positioning method relies on satellite positioning, using, for example, global poisoning system, GPS, and/or Galileo satellite constellations.

SUMMARY

According to some aspects, there is provided the subject-matter of the independent claims. Some embodiments are defined in the dependent claims. The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to a first aspect of the present disclosure, there is provided an apparatus comprising at least one processing core and at least one memory storing instructions that, when executed by the at least one processing core, cause the apparatus at least to process a measurement instruction received in the apparatus from a cellular communication system, based on the measurement instruction, measure a received signal strength of a signal from each cell of a first cell set and each cell of a second cell set, the first cell set and the second cell set comprising cells of the cellular communication system, and determine a first signal strength value for the first cell set and a second signal strength value for the second cell set, and report to the cellular communication system a value obtained from the first signal strength value and the second signal strength value.

According to a second aspect of the present disclosure, there is provided an apparatus comprising at least one processing core and at least one memory storing instructions that, when executed by the at least one processing core, cause the apparatus at least to obtain a time-difference based positioning result to determine an initial location estimate of a user equipment of a cellular communication system, obtain a value which defines, at least in part, whether a first signal strength value or a second signal strength value is larger than the other, wherein the first signal strength value and the second signal strength value are defined for a first cell set and a second cell set, respectively, the first and second signal strength values being determined by the user equipment, and revise the initial location estimate using the obtained value, such that a part of possible locations of the user equipment, present in the initial location estimate, are removed to obtain a corrected location estimate from the initial location estimate.

According to a third aspect of the present disclosure, there is provided a method comprising processing, in an apparatus, a measurement instruction received in the apparatus from a cellular communication system, based on the measurement instruction, measuring a received signal strength of a signal from each cell of a first cell set and each cell of a second cell set, the first cell set and the second cell set comprising cells of the cellular communication system, and determining a first signal strength value for the first cell set and a second signal strength value for the second cell set, and reporting to the cellular communication system a value obtained from the first signal strength value and the second signal strength value.

According to a fourth aspect of the present disclosure, there is provided a method comprising obtaining a time-difference based positioning result to determine an initial location estimate of a user equipment of a cellular communication system, obtaining a value which defines, at least in part, whether a first signal strength value or a second signal strength value is larger than the other, wherein the first signal strength value and the second signal strength value are defined for a first cell set and a second cell set, respectively, the first and second signal strength values being determined by the user equipment, and revising the initial location estimate using the obtained value, such that a part of possible locations of the user equipment, present in the initial location estimate, are removed to obtain a corrected location estimate from the initial location estimate.

According to a fifth aspect of the present disclosure, there is provided a non-transitory computer readable medium having stored thereon a set of computer readable instructions that, when executed by at least one processor, cause an apparatus to at least process a measurement instruction received in the apparatus from a cellular communication system, based on the measurement instruction, measure a received signal strength of a signal from each cell of a first cell set and each cell of a second cell set, the first cell set and the second cell set comprising cells of the cellular communication system, and determine a first signal strength value for the first cell set and a second signal strength value for the second cell set, and report to the cellular communication system a value obtained from the first signal strength value and the second signal strength value.

According to a sixth aspect of the present disclosure, there is provided a non-transitory computer readable medium having stored thereon a set of computer readable instructions that, when executed by at least one processor, cause an apparatus to at least obtain a time-difference based positioning result to determine an initial location estimate of a user equipment of a cellular communication system, obtain a value which defines, at least in part, whether a first signal strength value or a second signal strength value is larger than the other, wherein the first signal strength value and the second signal strength value are defined for a first cell set and a second cell set, respectively, the first and second signal strength values being determined by the user equipment, and revise the initial location estimate using the obtained value, such that a part of possible locations of the user equipment, present in the initial location estimate, are removed to obtain a corrected location estimate from the initial location estimate.

BRIEF DESCRIPTION OF THE DRAWINGS

FIG. 5 is a flow graph of a method in accordance with at least some embodiments of the present invention.

EMBODIMENTS

Herein are disclosed method to enhance an accuracy of node positioning in a cellular communication network which comprises non-terrestrial cells. The cellular communication network may, in addition to the non-terrestrial cells, comprise also terrestrial cells. Herein by terrestrial cell it is meant a cell of the cellular system which is controlled by a base station on the ground, and by non-terrestrial cell it is meant a cell of the cellular system which is controlled by a base station in a satellite in Earth orbit. In other words, a non-terrestrial cell as used herein is a satellite-based non-terrestrial cell. Where a timing-based positioning method produces an initial location estimate which has plural alternative solutions, meaning that the timing-based positioning method does not result in a single unambiguous location for the node, but at least two alternative areas or places where the node might be located, a cell set signal strength ratio is used to resolve the plurality of alternative solutions to arrive at a single, unambiguous positioning solution, a place or area where the node is located. The single positioning solution may be an area, reflecting the finite accuracy of all positioning mechanisms, but it is more usable than the estimate obtained directly from the timing-based positioning method which has plural disconnected, distinct areas where the node might be located.

Figure 1:
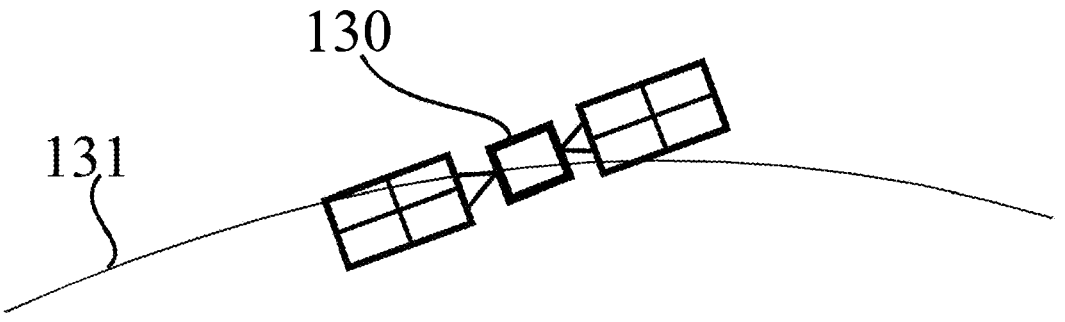
FIG. 1 illustrates an example system in accordance with at least some embodiments of the present invention.
Figure 1:
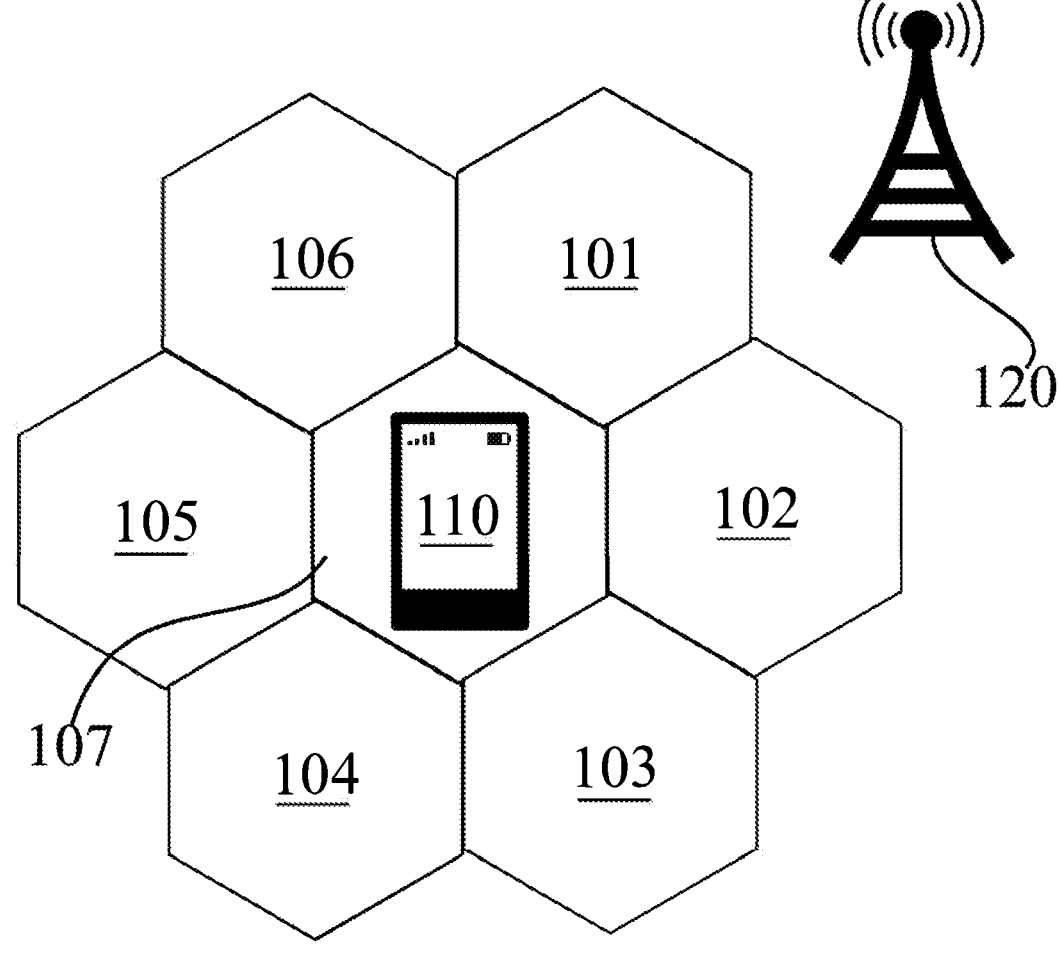

FIG. 1 illustrates an example system in accordance with at least some embodiments of the present invention. The system is a cellular communication system comprising cells 101-107. While these cells are illustrated in the figure, a cellular communication system may, in general, comprise a large number of cells, such as hundreds or even thousands of cells. Each cell is controlled by a base station, of which likewise a cellular communication system may comprise hundreds, or even thousands. A single base station may control more than one cell. Satellite 130 is in orbit 131 about the Earth. Orbit 131 may be a low-Earth orbit, LEO. LEO may be defined as an orbit of under 2000 kilometres, km, above the Earth's mean radius, for example, between 500-700 km above the Earth's surface. A satellite's altitude from the Earth's surface may vary greatly due to the oblateness of the Earth's shape and, more importantly, orbital parameters. An elliptical orbit varies in altitude by an order of magnitude during a single orbit. For this reason, an alternative way to define LEO is that orbits, whatever might be their altitude characteristics, with orbital periods of 128 minutes or less are low-Earth orbits. Alternatively to LEO, orbit 131 may be a medium Earth orbit, MEO, between 2000 and 35785 km, or a geostationary orbit, GEO, at 35786 km. Satellites of a satellite constellation may be in orbits of different types, such as LEO and MEO, for example.

Base station 120 is a terrestrial base station, while satellite 130 houses at least one further base station, capable of controlling one or more non-terrestrial, satellite-based cell. A cellular communication system may comprise exclusively terrestrial cells, exclusively non-terrestrial cells or both terrestrial and non-terrestrial cells. Cells of the system may overlap in coverage, in detail, smaller high-throughput cells may be disposed inside cell coverage areas of larger cells. In some systems, at least some small cells are based on a different radio-access technology, RAT, than larger cells of the system. Examples of cellular RATs include long term evolution, LTE, and fifth generation, 5G, technologies. 5G is also known as new radio, NR. The cellular communication system may comprise a constellation of plural satellites 130, of which a single one is present in FIG. 1 for the sake of clarity of the illustration.

User equipment, UE, 110 may comprise a smartphone, feature phone, tablet or laptop computer, Internet-of-Things, IoT, node, or a connected car connectivity module, for example. UE 110 may attach to terrestrial and/or non-terrestrial cells, as appropriate.

UE 110 may communicate with a non-terrestrial cell using a so-called service link from the UE to satellite 130. The satellite may have a so-called feeder link with a ground-based gateway to the rest of the cellular system. One benefit of non-terrestrial cells is that they may be very large, enabling provision of network coverage to even remote areas, such as the Earth's ocean surfaces. For example, non-terrestrial cells may be a few hundred kilometres in diameter. In general, whether for a terrestrial or non-terrestrial cell, a communication direction from a UE to a cell is named the uplink, while a communication direction from the cell to the UE is termed the downlink.

When performing a time difference-based positioning process in a non-terrestrial cell, or set of non-terrestrial cells 101-107, several round-trip time, RTT, or delay measurements may be conducted during a satellite flyover. This results in an initial location estimate of the UE in the coverage area of the cellular communication system. These positioning methods will, in the context of non-terrestrial cells, lead to two areas the UE may be in, on each side of an orbital plane of the satellite. The initial location estimate thus is of an ambiguous character. These possible areas of UE location are, in other words, mirrored with respect to the orbital plane of the satellite, the areas having the same delays or RTTs. It is not possible to resolve from these time-difference based methods, which area is the one where the UE actually resides in since the candidate areas have the same time difference characteristics. This means that these methods alone are suboptimal for the determination or verification of the UE's position. For most time-based methods the determined point of the UE's position will be a geographical area due to lack of absolute accuracy for the overall determination of the delay(s) of the propagation path.

The initial location estimate, however, may be useful as a starting point in case it can be resolved, which candidate area is the one in which the UE actually resides in, enabling the removal of the area in the location estimate which is a mere mirror of the correct one. Ideally, the UE's own report of its location is not relied on as-is, and the solution used to remove the ambiguity from the initial location estimate does not impact latency of services which use location, or privacy requirements of the UE.

Since the mirrored areas of possible UE location are mirrored with respect to the orbital plane of satellite 130, the duplicate area may be removed by using an item of data which enables selecting the correct area, or ruling out the incorrect area, from the initial location estimate. For example, in case the possible areas of UE location in the initial location estimate are in different cells, the correct one may be chosen based on knowledge of a cell identity of a cell in which the UE is attached. A more challenging situation is, where the possible areas of UE location in the initial location estimate are in the same cell.

Figure 2A:
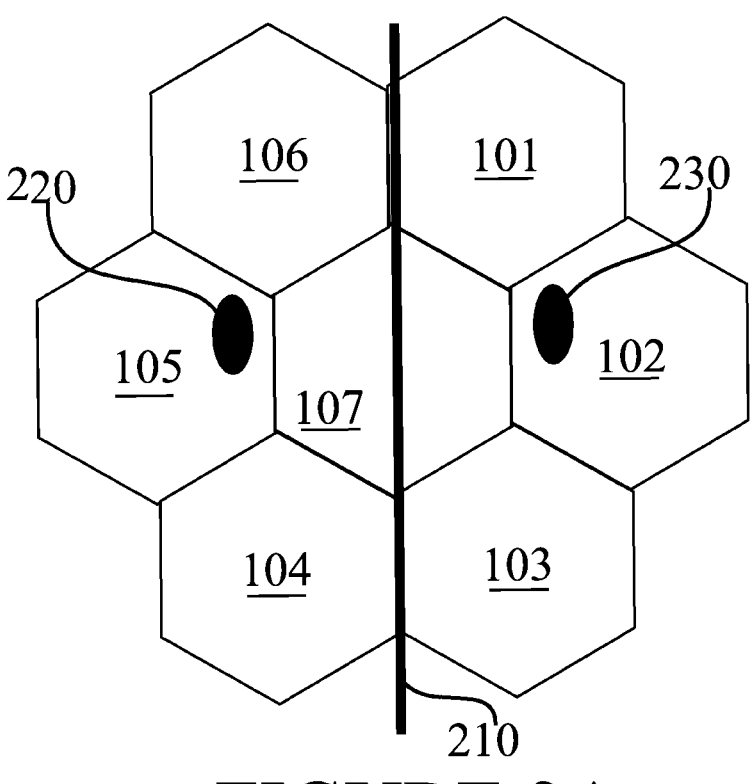
FIG. 2A illustrates a situation where the mirrored areas are in different cells.

FIG. 2A illustrates a situation where the mirrored areas are in different cells. Like numbering denotes like structure as in FIG. 1 In the illustrated example, the satellite's orbital plane is schematically denoted by axis 210, and the areas in the initial location estimate, determined based on the time difference-based positioning method, where the UE may be are denoted as areas 220 and 230. They are mirrored with respect to axis 210, that is, they are symmetrical with respect to the orbital plane of the satellite and have the same delay values. However, in this case deducing the area 220, 230 which is merely a mirror is easy since the network is aware of the specific cell from among cells 101-107 in which the UE is attached.

Figure 2B:
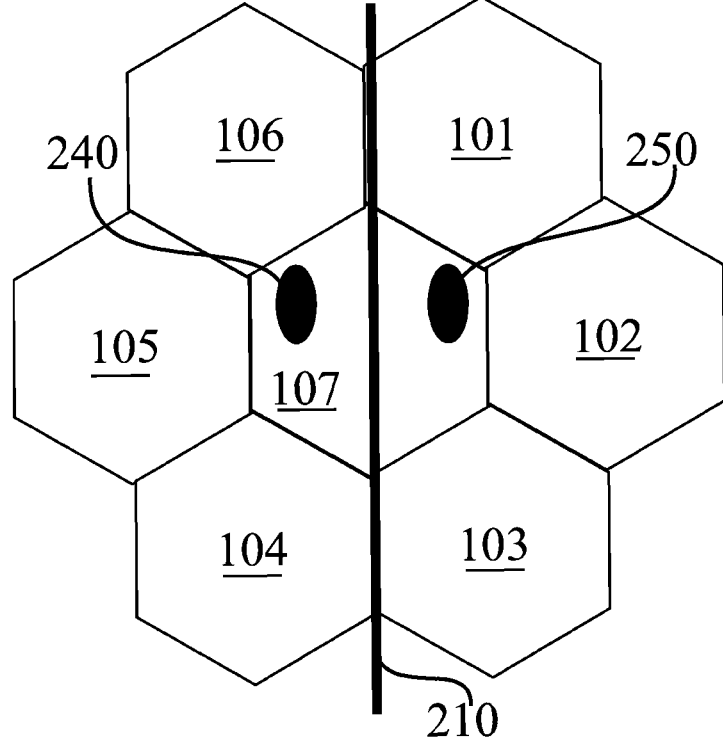
FIG. 2B illustrates a situation where the mirrored areas are in the same cell.

FIG. 2B illustrates a situation where the mirrored areas are in the same cell. Like numbering denotes like structure as in FIG. 1 and FIG. 2A. In this case, the UE is nearer the orbital plane of the satellite, and the areas 240, 250 in the initial location estimate, determined based on the time difference-based positioning method, where the UE may be, are both in cell 107. Thus the cell identity of the serving cell does not differentiate between the area from among areas 240, 250 where the UE actually is, and the mirrored area.

One way to determine which area 240, 250 is the one in which the UE resides is to have the UE measure signal strengths of all neighbouring cells 101-106, and to have the UE send results of these measurements to the network, NW. The NW might then try to estimate which of the two mirror areas 240, 250 is the correct one based on differences in the received signal strengths. However, the uplink link budget in non-terrestrial cells is generally quite limited, wherefore having to send measurement reports should be avoided where possible, and only be used for cases where the UE is in need of a handover from one cell to another. Particularly where the UE has already reported its estimated position and the NW wants merely to verify it, there is no real need for the UE to report such detailed information, and the UE would anyway prefer to invest as few resources as possible for additional validation. For example, reporting received signal strengths of all neighbouring cells would consume battery resources in the UE, in cases where the UE is battery-operated.

A more optimized method for resolving the ambiguity present in the initial location estimate is based on a signal strength ratio. In detail, a measurement instruction may be provided to the UE, directing the UE to measure a received signal strength of a signal from each cell of a first cell set and each cell of a second cell set. The UE may be configured to store definitions of the first cell set and the second cell set in terms of which cells are comprised in each cell set. The measurement instruction may define which cells are comprised in the first and second cell sets. The first and second cell sets may be compiled by a radio-access NW or a core NW, and the radio-access or core NW may then inform the UE of the compositions of the first and second cell sets using broadcast or dedicated signalling. The cells in the first and second sets may be comprised in the neighbouring cells of the cell in which the UE is attached. In some cases, the first and/or second cell set comprises only a single cell. The measurement instruction may be provided to the UE via a non-terrestrial or a terrestrial cell. The UE may be in contact with terrestrial and non-terrestrial cells at the same time.

Based on the measurement instruction, the UE measures the signal strengths, and determines a first signal strength value for the first cell set and a second signal strength value for the second cell set. For example, the first signal strength value may be an average, or weighted average, of signal strengths measured from the cell(s) in the first cell set.

Likewise the second signal strength value may be an average, or weighted average, of signal strengths measured from the cell(s) in the second cell set. In general, the cells in the first and/or second cell set may be terrestrial and/or non-terrestrial. In detail, they may be all non-terrestrial cells. The UE may be configured to, in case it fails to obtain a signal strength value for one of the cells in the first or second cell set, assign a default signal strength value for this cell. Alternatively, the UE may assign a value that is equal to an average of measured signal strengths of the other cells in the same cell set.

Once the first and second signal strength values are determined, the UE may report to the cellular communication system a value obtained from a ratio of the first signal strength value to the second signal strength value. In detail, the value determined from the ratio may be the ratio itself, expressed at a suitable accuracy using a suitable number of bits. Using fewer bits is useful in terms of the uplink link budget, however results necessarily in a less precise expression of the ratio. However, in many cases the ratio may be expressed at a very coarse precision, even a single bit to express, which signal strength value is stronger. This is the case, for example, where the cells all transmit at the same power, or known powers, and the first and second cell sets are suitably selected to enable differentiating between the actual and mirrored UE location area in the initial location estimate. More generally, the UE may report to the cellular communication system a value obtained from the first signal strength value and the second signal strength value, for example, a value that enables determining which one of the first signal strength value and the second signal strength value is the larger one of the two.

In other words, obtaining the reported value from the ratio of the signal strength values may comprise rounding the ratio to be expressed using a predetermined number of bits. The predetermined number of bits may be one, two, three or four bits, for example. The reporting may be performed to a terrestrial or to a non-terrestrial cell.

To enable discriminating between the actual UE position and the mirrored one, the first and second cell sets may be compiled such that they comprise cells on different sides of the orbital plane of the satellite. Taking into account the direction of propagation of the satellite, the first set may comprise cells to the left of the orbital plane, and the second set may comprise cells to the right of the orbital plane, or vice versa. For example, in FIG. 2B, the satellite traversing from the bottom of the figure toward the top, the first cell set may comprise cells 104, 105 and 106 and the second cell set may comprise cells 103, 102 and 101. In case the cells in the second set are received by the UE at a higher power, then area 250 is likely to be the where the UE is, and on the other hand if the cells in the first set are received by the UE at a higher power, then area 240 is likely to be the where the UE is. A node in the network which performs the deduplication to obtain the corrected location estimate may be a location management function, LMF, of a core NW, for example.

The base station may define, or convey, metrics for measurement that are able to resolve more than one single ambiguity location area. The defined metric may be able to resolve ambiguity to find the best candidate (find the winner approach), to resolve ambiguity to exclude the least probable candidate (find the loser approach), or to resolve ambiguity to validate whether a candidate is acceptable (verify the winner approach). The network may, by defining non-obvious cells into the first and second cell sets, avoid that the UE tries to cheat the ratio to mislead the NW concerning its location.

The UE may obtain the signal strength of the cells as a reference signal received power, RSRP, value, which may be expressed in a logarithmic scale in decibels. Obtaining a ratio of these logarithmic values amounts to subtracting one from another. An example metric that the NW may decide to use is, in terms of FIG. 2B, $$(RSRP\_102+k*(RSRP\_103+RSRP\_101))-$$
$$(RSRP\_105+k*(RSRP\_104+RSRP\_106)).$$

The factor k may be used to correct for different transmission powers used by the different cells, to render the received signal strength power measurements comparable to each other. Additionally or alternatively, weighting factors may be used to create a weight between a primary distinguishing cell, 102, and supporting cells 101, 103 (and likewise primary distinguishing cell 105 and supporting ones 104, 106 on the other side).

In terms of non-terrestrial cells, such cells may be co-moving with the satellite, known as Earth-moving cells, EMC, or the cells may be Earth-fixed cells, EFC. EFC cells are stationary on the Earth's surface. In EMC, the geometry of the cells with respect to the satellite is constant, while in EFC, the elevation angle of the satellite with respect to the cells changes. As is clear, the signal strengths from the cells, as measured in the UE, change as the satellite moves. However, the ratio of the signal strengths, in particular the ratio of signal strengths from the cell sets, is stabler than the absolute values of the signal strengths.

Yet further, observing FIG. 2B, the most difficult situation arises when the UE is close to the orbital plane of the satellite, since then the ratios of the received signal strengths will be fairly close to one. In this case, areas 240 and 250 are closer to each other. While this is the most difficult case, it is also the case where the location uncertainty due to mirroring is at its minimum since the candidate areas 240, 250 are close to each other and, when the UE is at the orbital plane, the areas even overlap. The NW may be configured to abstain from requesting the UE from performing the measuring and reporting in case the candidate location areas 240, 250 are within a preconfigured threshold distance from each other, since the de-duplication may be unnecessary and, due to the geometry, difficult to perform dependably. When the candidate areas 240, 250 are near each other, UE measurement error and the effects of layer-3 filtering, which the UE may employ, may reduce the reliability of the de-duplication based on the signal strength value ratio.

Of note is that in case the time-difference based positioning process is made using more than one satellite 130, the mirroring effect may be absent and the result of the initial location estimate may be unambiguous to begin with. Accordingly, in at least some embodiments the system is configured to perform the deduplication process described above only in contexts where the UE performs the time-difference based positioning method with a single-satellite only.

Figure 3:
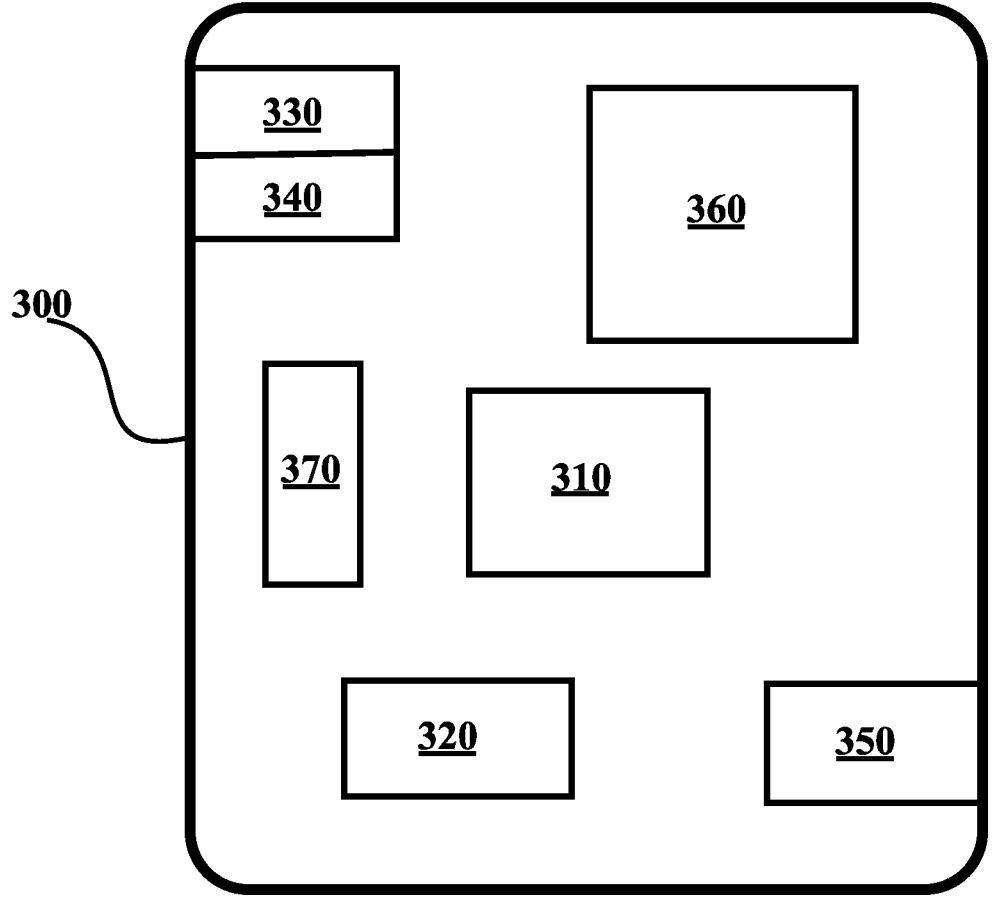
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a node such as UE 110 of FIG. 1 or, in applicable parts, a node of the NW, such as LMF, tasked with determining or verifying a UE location. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. When processor 310 comprises more than one processor, device 300 may be a distributed device wherein processing of tasks takes place in more than one physical unit. Processor 310 may be a control device. A processing core may comprise, for example, a Cortex-A8 processing core manufactured by ARM Holdings or a Zen processing core designed by Advanced Micro Devices Corporation. Processor 310 may comprise at least one Qualcomm Snapdragon and/or Intel Core processor. Processor 310 may comprise at least one application-specific integrated circuit, ASIC. Processor 310 may comprise at least one field-programmable gate array, FPGA. Processor 310 may be means for performing method steps in device 300, such as, for example, processing, measuring, determining, reporting, performing, obtaining and revising. Processor 310 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analogue and/or digital circuitry, and (b) combinations of hardware circuits and software, such as, as applicable: (i) a combination of analogue and/or digital hardware circuit(s) with software/firmware and (ii) any portions of hardware processor(s) with software (including digital signal processor(s)), software, and memory(ies) that work together to cause an apparatus, such as a mobile phone or a server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300. Memory 320 may be non-transitory. The term "non-transitory", as used herein, is a limitation of the medium itself (that is, tangible, not a signal) as opposed to a limitation on data storage persistency (for example, RAM vs. ROM).

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
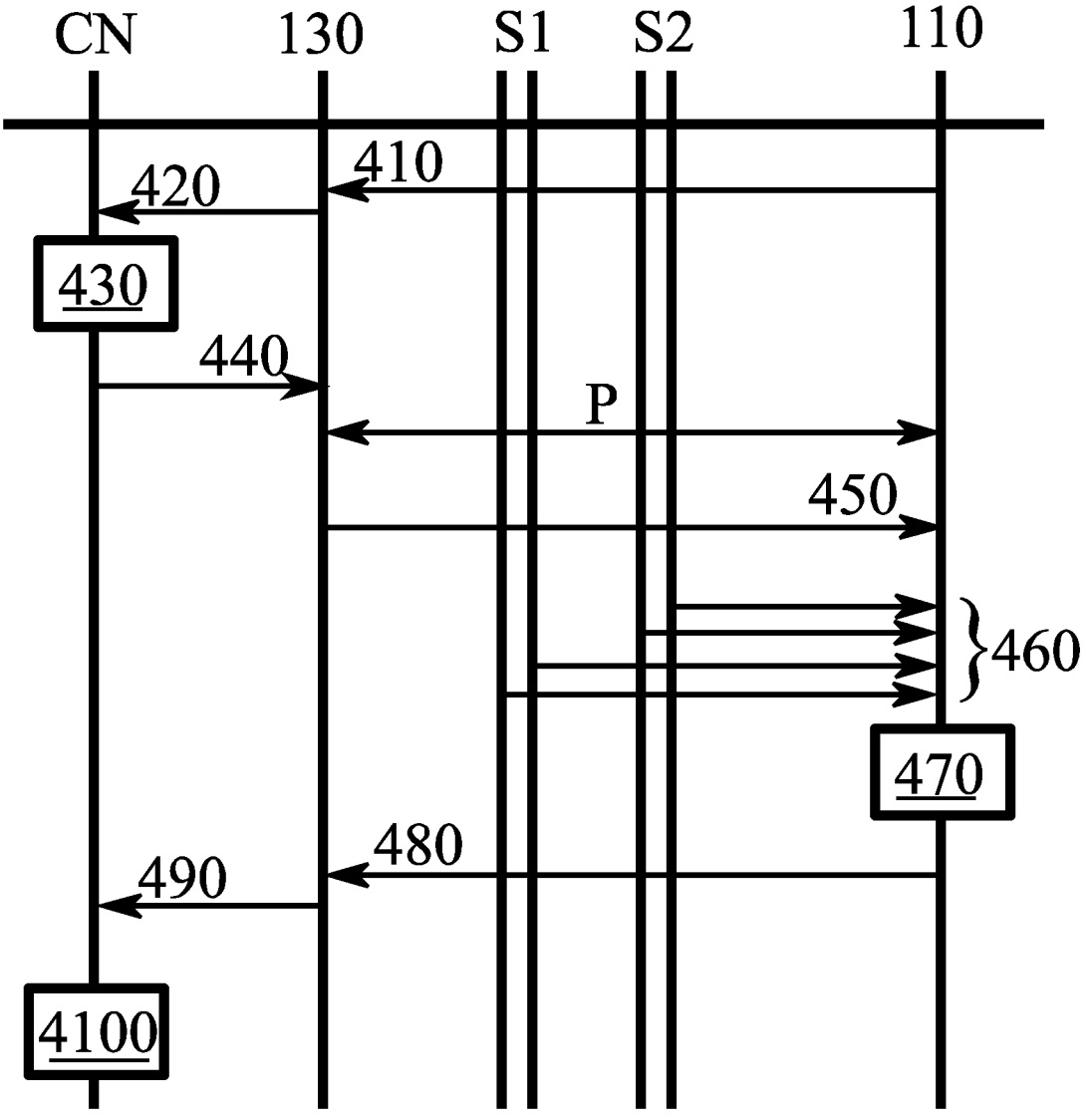
FIG. 4 illustrates signalling in accordance with at least some embodiments of the present invention.

FIG. 4 illustrates signalling in accordance with at least some embodiments of the present invention. On the vertical axes are disposed, on the left, a node of the core NW of the cellular network, such as LMF, tasked with determining UE location, satellite 130, first and second sets of cells S1 and S2, and on the right, UE 110. Time advances from the top toward the bottom.

Initially, in phase 410, UE 110 reports to satellite 130 its position. Satellite 130 conveys this position to core network node CN in phase 420. In phase 430, the CN node determines that the UE's self-reported position should be verified. The CN node instructs satellite 130 to perform the verification, phase 440. The first and second cell sets S1, S2 may be defined in the message, or messages, of phase 440, or satellite 130 may define them in response to receiving the message, or messages, of phase 440, for example. In time-difference based positioning phase P, an initial location estimate for UE 110 is obtained, wherein the initial location estimate has a mirrored area, as discussed herein above, creating ambiguity as to the UE's location. In phase 450, satellite 130 instructs UE 110 to report back the value based on the signal strength ratio between the first and second cell sets, as described herein above. The message, or messages, of phase 450 may comprise definitions of the first and second cell sets.

UE 110 receives signals from the cells comprised in the first cell set S1 and the second cell set S2 in phase 460. The transmission of signals, such as, for example, reference signals, from the cells of first and second cell set S1 and S2 may be continuous in nature, not occurring only during phase 460. The UE measures a received signal strength, such as RSRP, for example, from each cell in the first and second cell sets and in phase 470 determines the first signal strength value for the first cell set S1 and the second signal strength value for the second cell set S2. The value to be reported is obtained from a ratio between the signal strength values, as described herein above, and the value is reported to satellite 130 in phase 480. Satellite 130 conveys the value onward to the CN node in phase 490, and in phase 4100 the CN node employs the value to select from among the possible UE 110 location areas in the initial location estimate obtained from positioning phase P. Thus phase 4100 results in the corrected location estimate. The initial location estimate may be provided to the CN node in phase 490 along with the reported value, or it may be provided earlier in a separate message. In general, the order of phases may be different from that in FIG. 4, for example, the positioning process P may take place already before phase 410. In some embodiments phases 410, 420 and 430 are absent.

FIG. 5 is a flow graph of a method in accordance with at least some embodiments of the present invention. The phases of the illustrated method may be performed in UE 110, for example, or in a control device configured to control the functioning thereof, when installed therein.

Phase 510 comprises processing, in an apparatus, a measurement instruction received in the apparatus from a cellular communication system. Phase 520 comprises, based on the measurement instruction, measuring a received signal strength of a signal from each cell of a first cell set and each cell of a second cell set, the first cell set and the second cell set comprising cells of the cellular communication system. Finally, phase 530 comprises determining a first signal strength value for the first cell set and a second signal strength value for the second cell set, and reporting to the cellular communication system a value obtained from the first signal strength value and the second signal strength value.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in positioning wireless nodes.

ACRONYMS LIST

3GPP 3rd generation partnership project
EFC earth fixed cell
EMC earth-moving cell
GEO geostationary orbit
LEO low-Earth orbit
RAT radio-access technology

REFERENCE SIGNS LIST

| | |
|---|---|
| 110 | user equipment, UE |
| 101-107 | cells |
| 120 | (terrestrial) base station |
| 130 | satellite |
| 131 | orbit |
| 210 | orbital plane of satellite |
| 220, 230, 240, 250 | possible areas of UE location |
| 300-370 | structure of the device of FIG. 3 |
| 410-4100 | phases of signalling of the process of FIG. 4 |
| 510-530 | phases of the method of FIG. 5 |

TECHNICAL CLAUSES

Clause 1. An apparatus comprising:
means for processing, in the apparatus, a measurement instruction received in the apparatus from a cellular communication system which comprises satellite-based non-terrestrial cells;
means for, based on the measurement instruction, measuring a received signal strength of a signal from each cell of a first cell set and each cell of a second cell set, the first cell set and the second cell set comprising cells of the cellular communication system, and
means for determining a first signal strength value for the first cell set and a second signal strength value for the second cell set, and for reporting to the cellular communication system a value obtained from a ratio of the first signal strength value to the second signal strength value.
Clause 2. An apparatus comprising:
means for obtaining a time-difference based positioning result to determine an initial location estimate of a user equipment of a cellular communication system, the cellular communication system comprising satellite-based non-terrestrial cells;
means for obtaining a value which defines, at least in part, a ratio of a first signal strength value to a second signal strength value, wherein the first signal strength value and the second signal strength value are defined for a first cell set and a second cell set, respectively, the first and second signal strength values being determined by the user equipment, and means for revising the initial location estimate using the obtained value, such that a part of possible locations of the user equipment, present in the initial location estimate, are removed to obtain a corrected location estimate from the initial location estimate.

The invention claimed is:

1. An apparatus comprising at least one processing core and at least one memory storing instructions that, when executed by the at least one processing core, cause the apparatus at least to:

process a measurement instruction received in the apparatus from a cellular communication system, wherein the cellular communication system comprises satellite-based non-terrestrial cells, wherein the apparatus is configured to perform the receiving of the measurement instruction from a first satellite-based non-terrestrial cell of the cellular communication system;

based on the measurement instruction, measure a received signal strength of a signal from each cell of a first cell set and each cell of a second cell set, the first cell set and the second cell set comprising cells of the cellular communication system, wherein the cells in the first cell set and the second cell set are all satellite-based non-terrestrial cells, wherein the received signal strength of the signal from each cell of the first cell set and each cell of the second cell set are obtained as a reference signal received power (RSRP) value expressed in a logarithmic scale in decibels, wherein the cells in the first cell set and the second cell set are comprised in neighboring cells of a cell in which the apparatus is attached, and wherein the first cell set and the second cell set are compiled such that the first cell set and the second cell set comprise cells on different sides of an orbital plane of a satellite, the first cell set comprising cells to the left of the orbital plane and the second cell set comprising cells to the right of the orbital plane; and determine a first signal strength value for the first cell set and a second signal strength value for the second cell set, and report to the cellular communication system a value obtained from the first signal strength value and the second signal strength value, wherein the first signal strength value is a weighted average of signal strengths measured from the cells in the first cell set and the second signal strength value is a weighted average of signal strengths measured from the cells in the second cell set, wherein the apparatus is configured to perform the obtaining of the value from a ratio of the first signal strength value to the second signal strength value, wherein obtaining the value from the ratio of the first signal strength value to the second signal strength value comprises rounding the ratio to be expressed using a predetermined number of bits, and wherein the apparatus is configured to perform the reporting of the value to the first satellite-based non-terrestrial cell of the cellular communication system.

* * * * *